3,089,905
PROCESS FOR THE PRODUCTION OF 4-HYDROXYISOPHTHALIC ACID

James C. Wygant, Dayton, Ohio, assignor to Monsanto Chemical Company, St. Louis, Mo., a corporation of Delaware
No Drawing. Filed Jan. 13, 1960, Ser. No. 2,119
6 Claims. (Cl. 260—521)

This invention relates to the manufacture of hydroxydicarboxylic aromatic acids.

More particularly this invention is directed to an improved method of making 4-hydroxyisophthalic acid and salts thereof.

It is an object of this invention to provide a process for preparing 4-hydroxyisophthalic acid.

It is another object of this invention to provide a process for preparing 4-hydroxyisophthalate salts in much higher yields than was previously obtainable.

Other objects will become apparent from reading the specification below.

It is known that 4-hydroxyisophthalic acid is produced in small amounts, on the order of 3 to 5 percent, as a by-product in the commercial salicylic acid process. Its separation and purification from such materials is somewhat laborious. (S. E. Hunt, et al., Jour. Chem. Soc. (London), 1956, p. 3099.) This particular acid has also been prepared as one component of a mixture of products obtained when alkali metal phenates were carbonated. However, in such cases the yield of the product was low and was always complicated by the presence of other aromatic acids which were not easy to separate and by the presence of water given off as a by-product in some prior processes.

I have now discovered a method for preparing 4-hydroxyisophthalic acid in high yields and free of other dicarboxylic acid products. By this method the 4-hydroxyisophthalic acid product can easily be separated from any by-products.

Briefly the invention involves heating the potassium salt of salicylic acid or p-hydroxybenzoic acid or mixtures thereof under elevated carbon dioxide pressure at temperatures of at least 250° C. but not sufficiently high to cause substantial degradation of the organic substances. It is preferred to use the dipotassium salts of these acids as the starting materials, although the monopotassium salts may be used. By this treatment the salt starting material is carboxylated by means of carbon dioxide to the potassium 4-hydroxyisophthalate salts. When sufficient basic material and drying agent are present the yield of the product is raised to 100 percent of the theoretical. When added base is not present, i.e., when only the salt and carbon dioxide reactants are present, the resulting product dipotassium 4-hydroxyisophthalate, disproportionates to the completely neutralized salt and phenol, which is easily separated by known physical means, e.g., volatilization.

Other alkali metal salts of salicylic acid and 4-hydroxybenzoic acid may be carbonated according to this method but potassium salts are the preferred starting materials because of higher yields of 4-hydroxyisophthalic acid salts in more pure form. When, for example, the sodium salt of salicylic acid is carbonated according to the method of this invention, substantial quantities of hydroxytrimesic acid salts are also obtained which, for the purpose of this invention would merely serve to contaminate the product.

The carbonation treatment of the salicylic acid or 4-hydroxybenzoic acid salts according to this invention can be conducted in the solid or liquid state, i.e., the salt in the dry state can be subject to carbon dioxide pressure or the carbon dioxide can be passed through a liquid suspension of the potassium salicylate or 4-hydroxybenzoate. Any method of contacting the salt and the carbon dioxide may be used so long as superatmospheric pressures of carbon dioxide are used. For example, autoclave reactors, fluidized bed reactors, bomb reactors can all be used.

In conducting the process of this invention no materials other than the reactants i.e., the potassium salt of salicyclic or 4-hydroxybenzoic acid and carbon dioxide are needed. The yields of the 4-hydroxyisophthalic acid salt are higher when the starting material is in the dry, solid state, but when commercial quantities of the product are desired it may be advantageous to carbonate suspensions of the salicylic acid or 4-hydroxybenzoic acid salt in an inert liquid or solid. The inert liquid or solid serves as a diluent and as a heat-transfer agent, and facilitates handling the material. It also aids agitation of the reactants when agitation is desired. Inert materials such as biphenyl, phenyl ether, or mixtures thereof are examples of good inert liquids than can be used. Sand, glass or porcelain chips or the like are examples of solid inert materials that may be used.

The present process is ordinarily conducted at elevated temperatures, at least about 250° C., but at temperatures which are not sufficiently high to cause decomposition of the reactants under the reacton conditions, say, for example, from 300 to 500° C. Temperatures on the order of about 325° C. to 500° C. are ordinarly suitable, particularly temperatures from 350° C. to 400° C.

The reaction between the salicylic acid or 4-hydroxybenzoic acid salt and the carbon dioxide is conducted under superatmospheric carbon dioxide pressures for example from about 500 to 5000 p.s.i.g. or more. There is no upper limit on the amount of pressure to be used, other than as a matter of practicality. Pressures in the range of 700 to 2500 p.s.i.g. are ordinarily preferred. However, lower pressures down to 50 or 100 p.s.i.g. or the like can be used, although conversions are not as good.

The reaction time should ordinarly be sufficient to cause reaction of substantially all of the potassium salicylate reactant. The optimum reaction time will vary inversely with the reaction temperature and will also vary to some extent with heat transfer and other conditions of the reaction system. In the reactors described herein, reaction times of about 1 to 20 hours or more are satisfactory, but longer or shorter times can be used. Reaction times on the order of 3 to 15 hours are generally employed to get the optimum yields of product.

A special embodiment of this invention comprises the preparation of potassium salts of 4-hydroxyisophthalic acid by reacting a potassium salt of salicylic acid or 4-hydroxybenzoic acid with carbon dioxide under superatmospheric pressure at temperatures of from 300° to 500° C. in the presence of an alkaline compound of potassium and a drying agent. The basic potassium material serves to neutralize the carboxyl groups as they are formed and together with the drying agent serves as a diluent for the reactants; also, and when the mixture is agitated, these materials aid agitation of reactant and product mixture. Basic potassium materials useful for this invention include potassium carbonate for this purpose since the potassium ion is favorable to the formation of the 4-hydroxyisophthalic acid salt and results in the formation of minimum quantities of water by-product resulting from the neutralization of the carboxyl groups. The presence of such material is also desirable because by neutralizing the carboxyl groups as they are formed, the tendency of the product, i.e., the dipotassium salt of 4-hydroxyisophthalic acid, to disproportionate into the tripotassium neutralized salt and phenol is minimized, and the theoretical yield is to that extent increased.

The following chemical equations illustrate this point:

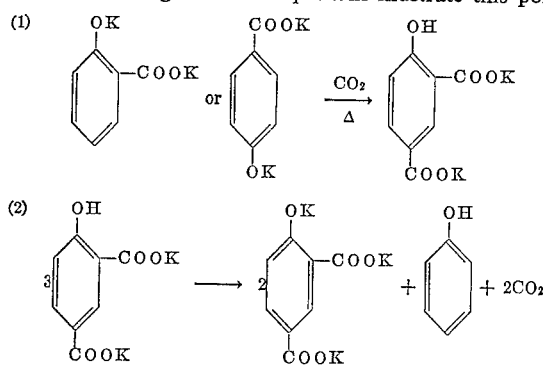

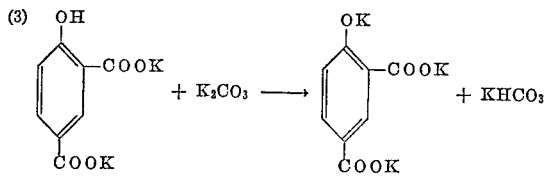

When such a basic material is incorporated into the reaction mixture, it can conveniently be employed in amounts equimolar with the salicylate salt, although greater or lesser amounts can be used, for example from less than 1% up to 200% by weight or more. The use of desiccants or drying agents is desirable to take any water of reaction and to insure an anhydrous system. The value of such materials is particularly notable when a basic material such as potassium hydroxide or other similar material is used as a basic potassium ion source. Drying agents such as calcium hydride, sodium hydride, aluminum carbide, and especially calcium carbide are contemplated.

The date on the carbonation of salicylate and 4-hydroxybenzoate salts are assembled in the table below. Where no liquid medium was employed, the reactions were run on glass trays in a 300 ml. bath-heated bomb, a description of which is given below. Experiments performed using a liquid medium were done in a 300 ml. bomb with rocking agitation. In each of the experiments, the reactants were charged to the bomb, the bomb was flushed 3-4 times with carbon dioxide, and pressured to 700-900 p.s.i.g.

The 300 ml. bomb used in these experiments was fitted with a stainless steel rack which accommodated 12 small glass trays, approximately 1 and ¼" in diameter by ½" deep. A two foot long piece of pressure tubing connected the bomb to an assembly consisting of a gage, valve and explosion disc. Charging and venting of gases was done through this assembly. The bomb after charging, was placed in an electrically heated nitrate bath 4" in diameter by 20" deep. The temperature of the bath was measured by two thermocouples, one near the top and the other at the bottom of the bomb. The thermocouple wires were inserted into ⅛" stainless steel tubes, which were fastened to the bomb by means of metal straps. The bath medium was a 56-30-14 percent by weight mixture of potassium, lithium, and sodium nitrates, M.P. 120° C. Stirring of the bath was accomplished simply and effectively by bubbling a slow stream of nitrogen through a copper tube leading to the bottom of the bath. After completion of each run, the bath was cooled to 175° C. The bomb was removed, vented and the parts completely disassembled while still hot, before the salt mixture crystallized.

Reaction conditions are summarized in the table. Work up for the individual reaction products obtained is described below.

TABLE 1

| Example | Reactants (Moles) | Liquid Medium | Temp., °C. | Product [a] | Yield, percent | Time, Hrs. | Starting Pressure, p.s.i.g. | Max. Pressure, p.s.i.g. |
|---|---|---|---|---|---|---|---|---|
| 1 | K₂Sal(0.1)[g] | none | 350 | 4-HIPA[b] | 69.7 | 6 | 900 | 2,100 |
| 2 | K₂(p-OHBenz)(0.1)[c] | do | 350 | 4-HIPA | 50.5 | 6 | 900 | 2,150 |
| 3 | K₂Sal(1.7) | Dowtherm[d] | 350 | 4-HIPA | 44 | 6 | 800 | 1,400 |
| 4 | Na₂Sal(0.1) | none | 350 | HOTrim | 50 | 6 | 900 | 2,300 |
| 5 | Na₂Sal(0.05), Na₂CO₃(0.2), CaC₂ | Dowtherm | 300 | 4-HIPA [f], HOTrim | | 3.5 | 900 | 2,000 |
| 6 | Na₂Sal(0.05), Na₂CO₃(0.02), CaC₂ | do | 250 | mostly unchanged Na₂Sal | | 4 | 880 | 1,600 |

[a] The products are the salts of the acids listed below.
[b] 4-HIPA is 4-hydroxyisophthalic acid.
[c] p-OHBenz is p-hydroxybenzoic acid.
[d] Dowtherm is a trade name for a mixture of biphenyl and phenyl ether.
[e] HOTrim is hydroxytrimesic acid.
[f] Mixture of HIPA and HOTrim obtained at this temperature.
[g] K₂Sal is dipotassium salicylate.

*Example 1*

The reaction mixture obtained from carbonating with carbon dioxide 0.1 mole of dipotassium salicylate was dissolved in 100 ml. of water, the solution filtered, and acidified with concentrated hydrochloric acid. The resulting precipitate was collected and washed with water to obtain 15.3 g. (70% yield) of 4-hydroxyisophthalic acid monopotassium salt, M.P. 340-343° C. (dec.). This salt appeared to be less soluble in water than either the normal salt or the free acid. After recrystallization from hot water, the product had a M.P. of 345- 347° C.

| | Found | Anal.—Calcd. for C₈H₅O₅K |
|---|---|---|
| Percent C | 43.45 | 43.7 |
| Percent H | 2.74 | 2.29 |

On recrystallization from dilute hydrochloric acid solution, the free acid (4-hydroxyisophthalic acid), was obtained, M.P. 288-298° C.

*Example 2*

The reaction mixture from carbonation with carbon dioxide of 0.1 mole of dipotassium p-hydroxybenzoate was dissolved in water, filtered, acidified with HCl, boiled, and cooled. The precipitated product was collected. The material, M.P. 320-360° C., was partly free acid and partly mono-salt. Recrystallization from dilute HCl gave 9.2 g. of 4-hydroxyisophthalic acid M.P. 282-293° C. dec. (50% yield). Nothing further was obtained by continuous extraction of the filtrate with ethyl acetate.

*Example 3*

The reaction product obtained by carbonating 1.7 moles of dipotassium salicylate with carbon dioxide in a Dowtherm (mixture of biphenyl and phenyl ether) slurry, was filtered, and the salt was washed with benzene. The salt was dissolved in 1000 ml. of water, and acidified with 350 ml. of concentrated hydrochloric acid. The precipitate was collected (after standing overnight) and washed with water. The material (which was almost entirely free acid) was recrystallized from a water-methanol mixture. This gave 112 g. of 4-hydroxyisophthalic acid, M.P. 297–298° C. dec. and 44 g. of the monopotassium salt of 4-hydroxyisophthalic acid, M.P. 345–348° C. dec. The salt was converted to free acid by recrystallization from dilute methanolic hydrochloric acid solution. The total yield was 44%.

*Example 4*

This example illustrates the formation of the hydroxytrimesic acid partial salt when the disodium salicylate salt was carbonated in the manner prescribed by this invention.

The reaction mixture obtained from carbonating 0.1 mole of disodium salicylate was dissolved in 100 ml. of water, and filtered. The filtrate was acidified with hydrochloric acid, and the resulting precipitate was collected. There was thus obtained 12.8 g. of hydroxytrimesic acid partial salt. Recrystallization of an aliquot from dilute hydrochloric acid provided hydroxytrimesic acid (50% yield) M.P. 312–314° C.

| Percent | Found | Anal.—Calcd. for $C_9H_6O_7$ |
|---|---|---|
| Percent C | 47.28 | 47.80 |
| Percent H | 3.04 | 2.67 |

*Example 5*

The product obtained from carbonating with carbon dioxide at 300° C. a mixture of sodium salicylate (0.05 mole), sodium carbonate (0.02 mole), and calcium carbide was dissolved in water, filtered, and acidified as in the prior examples. Analysis of the product proved it to be a mixture of 4-hydroxyisophthalic acid and hydroxytrimesic acid.

*Example 6*

Example 5 was repeated except that the carbonation was conducted at 250° C. instead of at 300° C. Analysis of the product showed that it was substantially all unreacted disodium salicylate.

*Example 7*

A mixture of 21.4 g. each of solid dipotassium salicylate and potassium carbonate was dried, and placed in a 300 ml. reaction bomb. The mixture was then subjected to carbon dioxide pressure of 1500 p.s.i.g. at 350° C. for 6 hours. After cooling and venting the bomb, the reaction product was removed therefrom and dissolved in water and acidified with hydrochloric acid. The resulting precipitate was purified by reprecipitating it several times with hydrochloric acid. The resulting solid, free 4-hydroxyisophthalic acid, melted at 283–287° C. (dec.).

What is claimed is:

1. The process which comprises reacting a dipotassium salt of an acid selected from the group consisting of salicylic acid and 4-hydroxybenzoic acid and mixtures thereof with carbon dioxide under superatmospheric pressure at a temperature of at least 250° C., but not sufficiently high to cause substantial degradation of the organic substances, and recovering as the essential product from the resulting reaction, a potassium salt of 4-hydroxyisophthalic acid.

2. The method of preparing 4-hydroxyisophthalic acid salts which comprises reacting dipotassium salicylate with carbon dioxide under superatmospheric pressure at temperatures of from 300 to 500° C.

3. The method of preparing 4-hydroxyisophthalic acid salt which comprises reacting the dipotassium salt of 4-hydroxybenzoic acid with carbon dioxide under superatmospheric pressure at temperatures of from 300 to 500° C.

4. The method of preparing 4-hydroxyisophthalic acid salts which comprises reacting a dipotassium salt of an acid selected from the group consisting of salicylic acid and 4-hydroxybenzoic acid and mixture thereof with carbon dioxide under superatmospheric pressure at temperatures of from about 300 to 500° C. in the presence of a potassium basic material selected from the group consisting of potassium carbonate and potassium hydroxide and drying agent.

5. The method according to claim 4 wherein the potassium basic material is potassium carbonate.

6. The method according to claim 4 wherein the drying agent is calcium carbide.

References Cited in the file of this patent

UNITED STATES PATENTS

| | | |
|---|---|---|
| 2,824,892 | Barkley | Feb. 25, 1958 |
| 2,904,587 | Johnson et al. | Sept. 15, 1959 |